United States Patent [19]

Wolff

[11] 4,315,213
[45] Feb. 9, 1982

[54] METHOD FOR OBTAINING AN ACCELERATION OR DECELERATION SIGNAL FROM A SIGNAL PROPORTIONAL TO SPEED AND APPARATUS THEREFOR

[75] Inventor: Manfred Wolff, Ladenburg, Fed. Rep. of Germany

[73] Assignee: Robert Bosch GmbH, Stuttgart, Fed. Rep. of Germany

[21] Appl. No.: 145,200

[22] Filed: Apr. 29, 1980

[30] Foreign Application Priority Data

May 10, 1979 [DE] Fed. Rep. of Germany ....... 2918802

[51] Int. Cl.³ .............................................. G01P 3/42
[52] U.S. Cl. ............................... 324/162; 246/182 C; 364/565
[58] Field of Search ................ 324/162, 161; 340/669; 73/514; 235/92 AE; 361/242; 364/426, 565, 566; 246/182 A, 182 C, 182 BH, 182 B

[56] References Cited

U.S. PATENT DOCUMENTS

| 2,658,670 | 11/1953 | Morton et al. | 364/565 |
| 3,820,712 | 6/1974 | Oswald | 364/565 |
| 3,891,046 | 6/1975 | Oicles | 361/242 X |

*Primary Examiner*—Stanley T. Krawczewicz
*Attorney, Agent, or Firm*—Edwin E. Greigg

[57] ABSTRACT

A method for obtaining an acceleration or deceleration signal from a signal proportional to the speed, consisting of storing the most recently ascertained n changes in a memory, wherein upon ascertainment of a new change to be stored in memory, the change which has been stored the longest is erased, and a deceleration or acceleration signal is formed by addition from the stored n changes, each time at intervals of $\Delta T$. Furthermore, in the method according to the invention, the presence of a deceleration or acceleration exceeding the threshold is recognized earlier.

8 Claims, 2 Drawing Figures

METHOD FOR OBTAINING AN ACCELERATION OR DECELERATION SIGNAL FROM A SIGNAL PROPORTIONAL TO SPEED AND APPARATUS THEREFOR

CROSS-REFERENCE TO RELATED INFORMATION

This application relates to a departure from the information disclosure of German laid-open application Nos. 23 42 358 and 24 38 273.

BACKGROUND OF THE INVENTION

The invention relates to a method and apparatus for obtaining an acceleration or deceleration signal from a signal proportional to speed, wherein at successive times, adjacent times being at a constant interval $\Delta T$ from one another, the change in the speed signal is ascertained with respect to the speed signal present at the foregoing time and the acceleration or deceleration signal is obtained by means of addition of a predetermined number of successive changes.

A method for obtaining the acceleration or deceleration is known from the German laid-open application No. 24 38 273. There, at successive measuring times of equal intervals $\Delta T$ apart, a stored digital speed signal is compared with the newly ascertained digital speed signal and the difference is furthermore filtered in order to eliminate interference. Subsequently, the filtered signals are added up until a predetermined period has elapsed. If during this period a predetermined threshold is not exceeded, then the period begins over again. If in the course of a period the threshold is exceeded, then a switching signal indicating the exceeding of an acceleration or deceleration threshold is generated; the period then immediately begins over again. In this laid-open application, it is also disclosed that the periods can be shortened and the threshold can be lowered, in order to be able to suppress the switching signal again immediately, upon a corresponding change in the course of acceleration or deceleration.

A method is also known from the German laid-open application No. 23 42 358 of storing the signal corresponding to a speed at the beginning of a measurement period and comparing this signal with the continuously ascertained signal corresponding to speed. If during the measurement period a predetermined threshold is not exceeded as a result of the difference, then a new measurement period begins upon the end of the foregoing period. If the threshold is exceeded during the period, then a switchover is made immediately to a new beginning of a period, the switching signal is generated, and if needed the measurement period is shortened and the threshold is lowered.

In both methods and their attending apparatus, it can happen or occur that the threshold is almost attained at the end of a measurement period. Despite this, a new measurement period begins and the difference, or the sum of the difference values, must be generated again from zero, until they exceed the threshold. Thus, in these methods, it may happen that the switching signal is generated quite belatedly, with its generation depending on the coincidental relationship between the phase position of the measurement period and the course of the acceleration or deceleration. Shortening the measurement period after a first occurrence of exceeding the threshold is intended to counteract this possible delay in the signal generation. When the switching signal is used in a control loop, for instance an anti-locking control system, this delay can have quite deleterious effects.

OBJECTS AND SUMMARY OF THE INVENTION

It is accordingly a principal object of the invention to avoid the disadvantage discussed above, that is, to improve the known method and apparatus in such a way that changes in the wheel behavior are ascertained much more rapidly and precisely from the standpoint of measurement technology.

This object is attained in that each measured change in the speed is stored in a first memory having at least n memory possibilities for these changes, that at intervals of $\Delta T$ the acceleration or deceleration signal is obtained from the particular n changes most recently stored in memory, and that at intervals of $\Delta T$ the particular change which was the earliest to be stored in memory is erased. The acceleration or deceleration signal can be formed, for instance, by adding up, at intervals of $\Delta T$, the particular n changes which have been stored and most recently measured. However, it is also possible to store up the particular acceleration or deceleration signal obtained and, after the next successive (mth) measurement of a change, to add this change to the stored acceleration or deceleration signal and in exchange to subtract the $(m-n)$th change, which is likewise still in storage.

In addition, one can compare the acceleration or deceleration signal obtained upon each measurement of change with the foregoing value and store the change thus ascertained in a second memory having at least n memory possibilities for these changes, obtain the acceleration or deceleration signal from the particular most recently stored n changes at intervals of $\Delta T$, and erase the particular change which had earliest been stored in the memory.

The acceleration or deceleration change signal can be formed, for instance, by adding up, at intervals of $\Delta T$, the particular n changes stored and most recently ascertained. However, it is also possible to store up the ascertained acceleration or deceleration change signal and after the next successive (mth) measurement of a change to add this change to the stored acceleration or deceleration change signal and in exchange to substract the $(m-n)$th change which is also stored in the memory.

With the method according to the invention, at short time intervals of $\Delta T$ one obtains a signal corresponding to the acceleration or deceleration prevailing at that instant, or a signal corresponding to the acceleration or deceleration change, the first corresponding mathematically to the first derivative of the speed over time and the second corresponding mathematically to the second derivative of the speed over time. The acceleration or deceleration signal substantially corresponds to the previously known acceleration variable; the difference is only that here, in addition, as many switching thresholds, free of delay, can be realized as may be desired, depending on the degree of resolution of the graph.

In addition, however, the acceleration or deceleration change signal is newly utilized as an auxiliary control variable, which permits wheel movement changes to be ascertained substantially better and more sensitively from the standpoint of measurement technology.

The invention will be better understood and further objects and advantages thereof will become more apparent from the ensuing detailed description of preferred exemplary embodiments taken in conjunction with the drawings.

DETAILED DESCRIPTION OF THE PREFERRED EMBODIMENT

Figure 1:
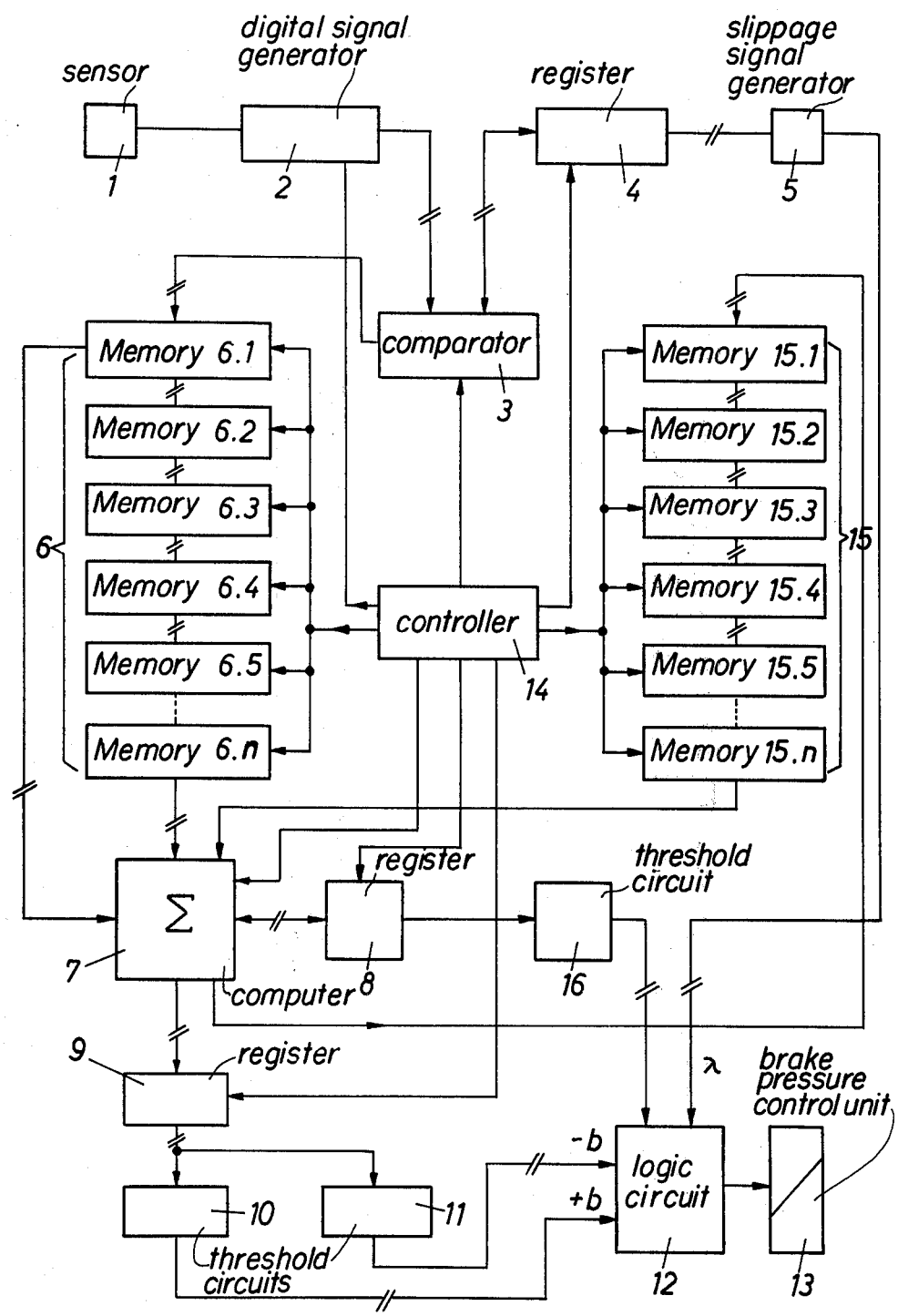
FIG. 1 shows a first exemplary and schematic diagrammatic embodiment of the invention, used in connection with an anti-locking controller.

At the outset and referring to the drawings, it should be noted that the lines on which slanting markings (//) are indicated are symbol lines intended for the parallel transmission of digital signals.

FIG. 1 shows a sensor 1 for ascertaining the rotary speed of a vehicle wheel, a known arrangement 2 for obtaining a digital signal, a comparator 3, a register 4, a known arrangement 5 for obtaining a slippage signal, a memory arrangement 6 having a memory capacity of n changes in the wheel speed according to amount and to algebraic sign, a computer 7, further registers 8 and 9, threshold circuits 10 and 11, a logic circuit 12 and a brake pressure control unit 13. The control element which controls the course of the method is given reference numeral 14; a memory arrangement and memory capacity of n changes in the acceleration signal according to amount and to algebraic sign is indicated by reference numeral 15; and a threshold circuit is indicated by reference numeral 16.

The arrangement of FIG. 1 functions as follows:

The speed processing means 2 evaluates the pulses, dependent on the wheel speed, of the sensor 1. After a predetermined time $\Delta T$ has elapsed, the result is called up by the control element 14. The result proceeds to the comparator 3, which compares the input signal, corresponding to the instantaneous wheel speed, with the signal stored in register 4 from the measurement which (by an interval of $\Delta T$) preceded it and furnishes an output signal, corresponding to the change and containing the amount and the algebraic sign, to the memory 6. The comparison in the comparator 3 and the storage of the new speed value in the register 4 are again controlled by means of the central control element 14. In a known fashion, a slippage signal is also obtained in block 5 from the speed signal present in register 4 and this slippage signal ($\lambda$) is delivered to the logic circuit 12.

The memory 6 comprises n partial memories 6.1–6.n, in which the n changes most recently ascertained in comparator 3 are stored according to amount and algebraic sign. Under the control of the central control element 14, the stored signals of the memories 6.1–6.n are shifted downward into the next adjacent memory, the shift occurring at intervals of $\Delta T$. Thus space is obtained for each newly ascertained signal in the memory 6.1. The content of the memory 6.n is in turn erased by the central control element 14 as a result of the shift signal sent to memory 6. Before the shift command, the information located in memory 6.n is subtracted by the computer 7 from the sum value in the register 9.

After each new storage of information in memory 6.1, the computer 7 comes into action under the control of the control element 14 and adds to the result of computation previously (that is, T earlier) stored in register 9 the signal newly stored in the memory 6a. Thus the sum of the signals now present in the memories 6.1–6.n is now formed, because the same computation was performed each time previously. This sum signal is again written into the register 9.

In the comparators or threshold circuit units 10 and 11, the signal made up of the amount and the algebraic sign is compared in the register with thresholds of differing algebraic signs and possibly differing amounts. Signals of +b and −b, respectively, are established at the outputs whenever the wheel exceeds a wheel acceleration (+b) or wheel deceleration (−b) determined by the thresholds in the comparators or threshold circuits 10 and 11. These signals −b and +b as well as the slippage signal $\lambda$ are linked in the logic circuit 12 in a known manner in such a fashion that suitable trigger signals are delivered to the pressure control member 13. Parallel to the computation of the acceleration signal in the memory 9, the change of the acceleration signal is ascertained via the computer 7 under the control of the control element 14 and stored in the memory 15. Simultaneously, in the same manner as at register 6, the sum signal of all n partial changes is formed in the memory 15 and stored in the register 8. The acceleration change signal is compared via the threshold circuit 16 with values of differing amount and algebraic sign and delivered to the outputs of the logic circuit 12. These signals can be used here for the purpose of changing the pressure gradient, for example.

Figure 2:
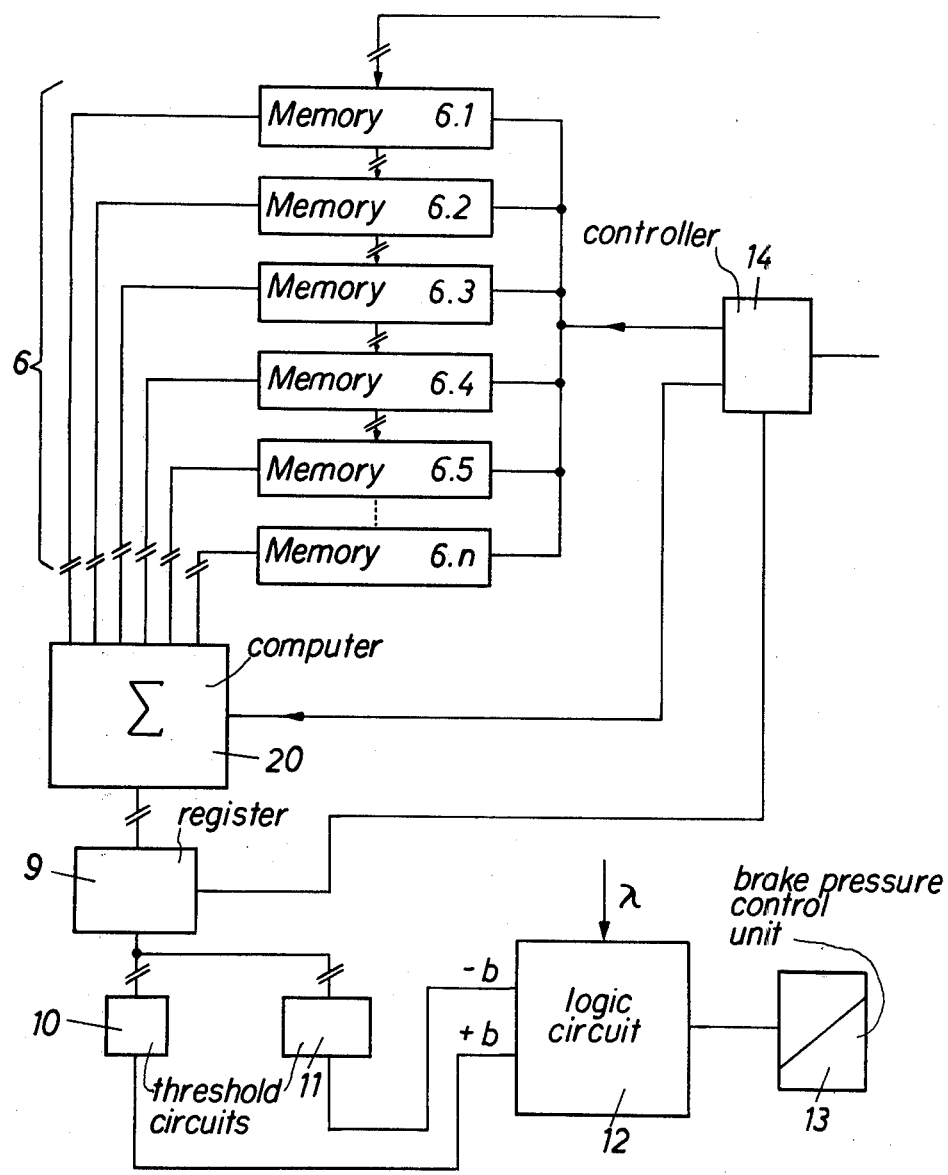
FIG. 2 shows an exemplary and schematic diagrammatic embodiment in which a portion of the arrangement of FIG. 1 is varied also within a preferred embodiment of the invention.

In FIG. 2, the only change is in the means of evaluation in the memory 6. Elements 6, 9, 10, 11, 12, 13 and 14 correspond to those of FIG. 1 and are accordingly given the same reference numerals.

Here, the computer 20 is connected to all the partial memories 6.1–6. n. After the storage of a new change signal in the partial memory 6.1, the computer 20, under the control of the central control element 14, adds all the signals stored in the partial memories 6.1–6. n and furnishes the result to register 9. Further processing is done in the manner already described in connection with FIG. 1. With a correspondingly embodied arrangement, the acceleration change (as in FIG. 1) can again also be obtained.

With the acceleration or deceleration change signal obtained in accordance with the invention, a developing trend in wheel behavior is much earlier recognized. Thus, it is possible to react much earlier to such a change in the trend, by means of switchover of the pressure gradient. Turning points or extreme values in the wheel speed curve can be distinguished, for example, and, as stated, the pressure gradient can be changed; an earlier transition to maintenance of a constant level can be made, for instance.

The foregoing relates to preferred exemplary embodiments of the invention, it being understood that other embodiments and variants thereof are possible within the spirit and scope of the invention, the latter being defined by the appended claims.

What is claimed and desired to be secured by Letters Patent of the United States is:

1. A method for obtaining an acceleration or deceleration signal from a signal sensor proportional to a speed, comprising measuring at successive times, of which adjacent times are at a constant interval of $\Delta T$ from one another, the change of the speed signal relative to the particular speed signal present at the foregoing time and the acceleration or deceleration signal obtained by means of addition of a predetermined number of successive changes, storing each measured change is stored in a memory having at least n memory possibilities for these changes, obtaining a signal at intervals of $\Delta T$ of the acceleration or deceleration signal from the particular n changes most recently stored and erasing at intervals of $\Delta T$ the particular change stored earliest in the memory.

2. A method as defined by claim 1, wherein in order to form the acceleration or deceleration signal the n stored values are added up.

3. A method as defined by claim 1, wherein in order to form the acceleration or deceleration signal the newly obtained mth change is added and the (m−n)th signal is subtracted from the acceleration or deceleration signal obtained and stored at the foregoing time.

4. A method as defined by claim 1, wherein at successive times, of which adjacent times are at constant intervals of $\Delta T$ from one another, the change of the acceleration or deceleration signal is ascertained relative to the acceleration or deceleration signal present at the foregoing time, that each ascertained change is stored in a further memory having at least n memory possibilities for these changes, that at intervals of $\Delta T$ the acceleration or deceleration change signal is obtained from the n changes most recently stored and that at intervals of $\Delta T$ the change stored earliest in the memory is erased.

5. A method as defined by claim 4, wherein in order to form the acceleration or deceleration change signal the n stored values are added up.

6. A method as defined by claim 4, wherein in order to form the acceleration or deceleration change signal the newly obtained mth change is added and the (m−n)th signal is subtracted from the acceleration or deceleration change signal obtained and stored at the foregoing time.

7. Apparatus for obtaining an acceleration or deceleration signal from a signal sensor proportional to a speed, comprising means measuring at successive times, of which adjacent times are at a constant interval of $\Delta T$ from one another, the change of the speed signal relative to the particular speed signal present at the foregoing time and the acceleration or deceleration signal is obtained by means of addition of a predetermined number of successive changes, means storing each measured change is stored in a memory having at least n memory possibilities for these changes, means obtaining a signal at intervals of $\Delta T$ the acceleration or deceleration signal from the particular n changes most recently stored and means erasing at intervals of $\Delta T$ of the particular change stored earliest in the memory.

8. Apparatus as defined by claim 7, wherein means storing the n values are added up to derive the acceleration or deceleration signal.

* * * * *